United States Patent [19]

Fey

[11] 4,080,194
[45] Mar. 21, 1978

[54] TITANIUM OR ZIRCONIUM REDUCTION PROCESS BY ARC HEATER

[75] Inventor: Maurice G. Fey, Plum Borough, Pa.

[73] Assignee: Westinghouse Electric Corporation, Pittsburgh, Pa.

[21] Appl. No.: 745,728

[22] Filed: Nov. 26, 1976

[51] Int. Cl.² ............... C22B 4/02; C22B 26/10; C22B 26/20
[52] U.S. Cl. ................... 75/10 R; 75/66; 75/67 R; 75/84.5
[58] Field of Search ........... 75/84, 10 R, 84.5, 66, 75/67, 10 A

[56] References Cited
U.S. PATENT DOCUMENTS

| | | | |
|---|---|---|---|
| 2,816,828 | 12/1957 | Benedict | 75/84.5 |
| 3,825,415 | 7/1974 | Johnston | 75/84.5 |
| 3,843,351 | 10/1974 | Smith | 75/10 R |
| 3,893,845 | 7/1975 | Mahaffey | 75/10 R |

*Primary Examiner*—P. D. Rosenberg
*Attorney, Agent, or Firm*—L. P. Johns

[57] ABSTRACT

A process for reducing a metal from a metal halide characterized by the steps of feeding into the arc heated stream of an arc heater a quantity of a reactant metal such as an alkali or alkaline-earth metal, feeding into the arc stream a quantity of a metal halide, which metal has a melting point higher than the boiling point of the co-product salt formed by reduction of the metal, the co-products being a liquid elemental metal and a gaseous salt, projecting the co-products into a reaction chamber tangentially to cause the liquid metal to separate centrifugally from the lighter, gaseous salt, and depositing the liquid metal in an associated receptacle.

9 Claims, 5 Drawing Figures

TITANIUM OR ZIRCONIUM REDUCTION PROCESS BY ARC HEATER

CROSS-REFERENCE TO RELATED APPLICATIONS

This application is related to the applications Ser. No. 745,725, filed Nov. 26, 1976 by Maurice G. Fey and Charles B Wolf; Ser. No. 757,546, filed Jan. 6, 1977 by Maurice G. Fey; and Ser. No. 757,545, filed Jan. 6, 1977 by Francis J. Harvey II.

BACKGROUND OF THE INVENTION

1. Field of the Invention

This invention relates to a process for the production of titanium and zirconium by the use of arc heater furnaces.

2. Description of the Prior Art

Many metals can be reduced or displaced from their compounds by more active metals. This technique is fairly common in the preparation of many of the rarer metals. Metals which melt at low temperatures, such as aluminum and magnesium, can be easily handled. However, metals having very high melting points such as titanium and zirconium are more difficult. One reason for the difficulty is that the higher melting metals are very reactive in their molten state and conventional ceramic crucibles are quickly deoxidized and destroyed thus contaminating the metal product. Graphite crucibles contain them but also contaminate the metal product.

The reduction process most commonly used to produce titanium and zirconium is the Kroll process. In this process the ores are heated with carbon in an electric furnace in the presence of chlorine gas causing the formation of metal chlorides, carbon monoxide and carbon dioxide gas. The chlorides are then distilled and condensed to effect purification. In the production of titanium a steel-walled furnace is used and is preliminarily heated to about 750° C. It contains helium gas and clean magnesium bars. Liquid titanium tetrachloride ($TiCl_4$) is caused to drip on the magnesium bars where it reacts isothermally to form titanium metal. The metal forms as a strong sponge containing magnesium chloride and magnesium metal. These products are then removed from the reaction chamber by a machining operation, and the chips are purified by leaching with dilute hydrochloric acid or by vacuum distillation. Finally, the sponge chips are compressed into consumable electrodes, which are then vacuum arc melted to produce solid ingots. If there is a high level of impurities in the original sponge, it may have to be remelted more than once. The zirconium process is similar to the titanium process, except that the zirconium tetrachloride ($ZrCl_4$) is solid when it enters the reaction chamber. Although magnesium is the preferred metal for producing titanium and zirconium, other active metals such as sodium may be used as reducing agents. Generally, the Kroll process with its many sequential steps has the disadvantage of being extensive which is the main reason for the high price of titanium and zirconium.

SUMMARY OF THE INVENTION

In accordance with this invention, it has been found that a more expedient process for the production of titanium and zirconium is available, which process comprises the steps of providing an arc heater having spaced generally hollow, cylindrical electrodes forming an arc chamber communicating with a reaction chamber, striking an electric arc in an axial gap between the electrodes, introducing a gas selected from the group consisting of argon, helium, hydrogen, and carbon monoxide, through the gap to provide an elongated arc stream extending into the reaction chamber, feeding into the arc heated gas stream a quantity of one element selected from the group consisting of an alkali metal and an alkaline-earth metal, feeding into the arc heated gas stream a quantity of a metal halide, the metal of which has a melting point higher than the boiling point of the co-product salt formed with the metal, the co-products being liquid elemental metal and a gaseous salt, projecting the reaction products in the reaction chamber tangentially to cause the liquid elemental metal to separate centrifugally from the lighter, gaseous salt, and depositing the liquid elemental metal on a downwardly extending surface to permit the metal to flow into an associated receptacle.

The advantage of the process of this invention is that the reduction process for the metals involved utilizing an electric arc heater as a source of energy combined with a uniquely designed reaction chamber to eliminate some of the steps of the Kroll reduction process. The steps eliminated are the the sponge machining, leaching, compressing, and remelting. Those steps are eliminated because the reduction process takes place at higher temperatures where titanium or zironium are liquid and are separated from gaseous halide co-products, such as $MgCl$ or $NaCl$, while they are still in the liquid state and in a centrifuging reaction chamber. Molten metal collects on the peripheral wall of the centrifuging reaction chamber where some of it solidifies until an equilibrium wall thickness of the molten metal is established and subsequent deposited metal flows into the bottom of the reaction chamber into an ingot mold. The hot metal chloride gas exits at the top of the chamber and is later condensed, coolec and separated from the arc heater gases, which in this case may be a mixture of argon and hydrogen. Finally, the reaction chamber may contain water cooled walls or alternatively may be designed to minimize the heat transfer rate to the water cooled peripheral walls by employing a liner of a high temperature material such as tantalum or tungsten. The liner is cooled by radiation to the water cooled outer walls which may additionally be lined with a thin layer of ceramic material depending upon the coefficient of thermal conductivity of the metal being deposited. The normal operating temperature range of the liner is about 1400° to 1600° K.

DESCRIPTION OF THE PREFERRED EMBODIMENTS

In accordance with this invention the process is carried out as follows:

A. providing an arc heater having spaced generally hollow, cylindrical electrodes forming an arc chamber communicating with a reaction chamber;

B. striking an electric arc in an axial gap between the electrodes;

C. introducing a gas selected from the group consisting of hydrogen and argon through the gap to provide an elongated arc stream extending into the reaction chamber;

D. feeding into the arc heated gas stream a quantity of one element selected from the group consisting of an alkali metal and an alkaline-earth metal;

E. feeding into the arc heated gas stream a quantity of halide, such as a fluoride, chloride, iodide or bromide, of a metal having a melting point higher than the boiling point of the co-product salt formed with the metal, the co-products being a liquid elemental metal and a gaseous salt;

F. projecting the reaction products into the reaction chamber tangentially to cause the liquid elemental metal to separate centrifugally from the lighter gaseous salt; and G. depositing the liquid elemental metal on the downwardly extending surface to permit the metal to flow into an associated receptacle.

Figure 1:
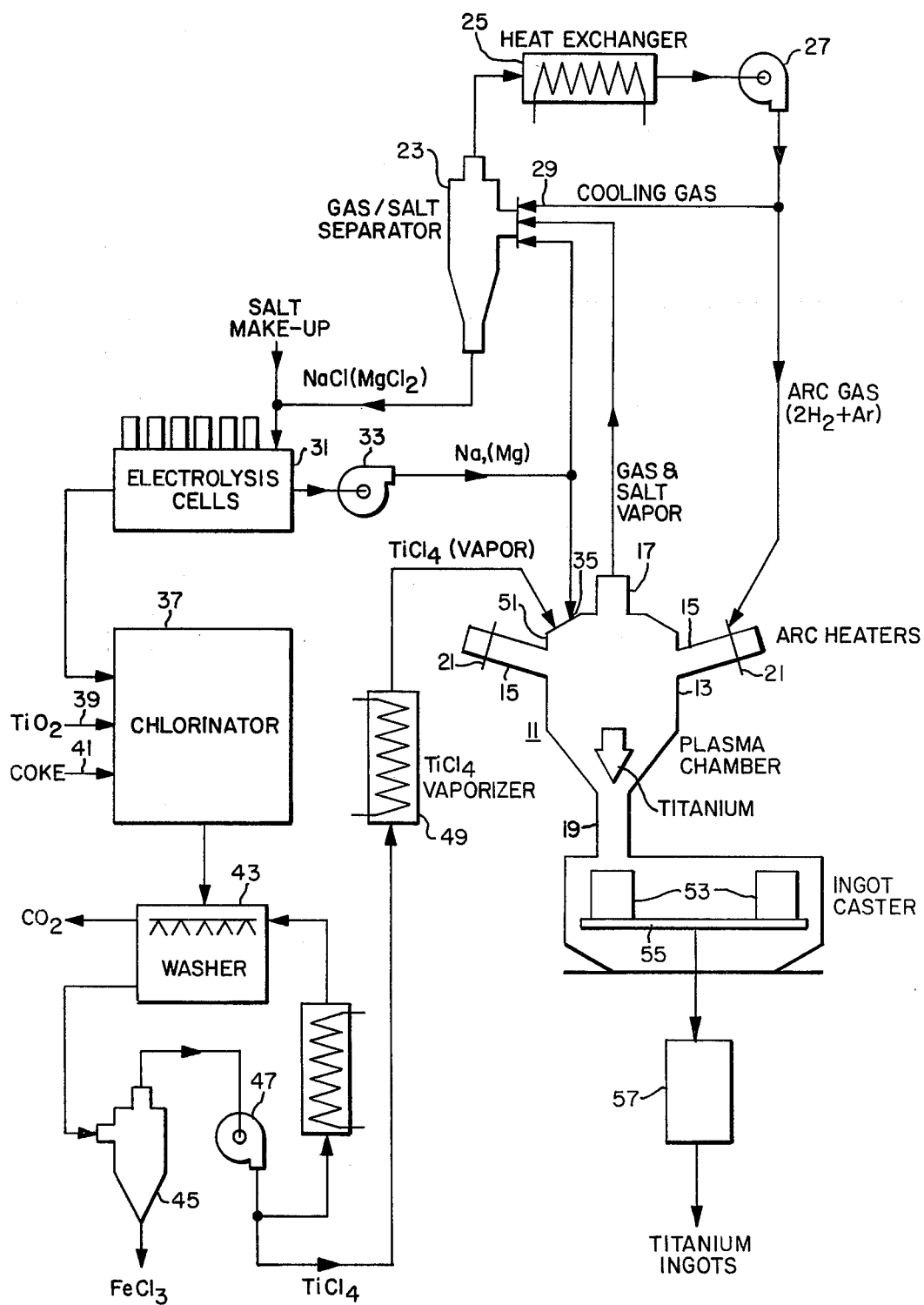
FIG. 1 is a flow diagram.

The process may be carried out in a reactor generally indicated at 11 in the drawings. The reactor 11 is supported by associated structures as shown in FIG. 1. The reactor 11 comprises a centrifugal or plasma chamber 13, at least one and preferably a plurality of arc heaters 15, a first vent or outlet means 17 for co-product gases, and second vent or outlet means 19 for the primary product, namely, elemental metal such as titanium.

Arc heated gas is introduced into the system at 21 through the arc heaters 15 as will be set forth more particularly below. The gas together with the lighter co-products including salt vapor leave the reactor through the outlet means 17 and are connected to a cyclone-type separator 23 for separating the gas and salt, the former of which is transmitted to a heat exchanger 25 for cooling and redirected by a pump 27 into the arc heaters at inlet 21. Cooling gas is also introduced at inlet 29 of the separator to cool the gas-salt mixture sufficient to condense the salt to the liquid state. The liquid salt leaves the lower end of the separator 23 from where it is conducted to at electrolysis cell 31 for disassociating the salts into their primary elements, such as sodium or magnesium and chlorine or bromine.

The metal sodium or magnesium is transmitted by a pump 33 to an inlet 35 where it is introduced into the reactor. The resulting chlorine from the cell 31 is conducted to a chlorinator 37 where, together with a metal oxide such as titanium dioxide, introduced at inlet 39 and a carbonaceous material, such as coke, introduced at inlet 41 react with the chlorine to produce a metal tetrachloride, such as titanium tetrachloride ($TiCl_4$), and carbon dioxide which are directed to a washer 43 for separation. The metal chloride proceeds through a cyclone separator 45 for removal of any foreign materials such as $FeCl_3$, from where the tetrachloride is moved by a pump 47 to a vaporizer 49 and then to the reactor 11 at an inlet 51.

The end product is an elemental metal, such as titanium, which drops through the outlet means 19 into a mold 53 which, as shown in FIG. 1, is one of a plurality of similar molds placed upon a rotatable platform 55 by which a plurality of similar molds 53 may be filled. Thereafter, optionally ingots may be removed from the mold 53 and subjected to a remelting stage 57 to further refine the metal such as by degassing.

Figure 2:
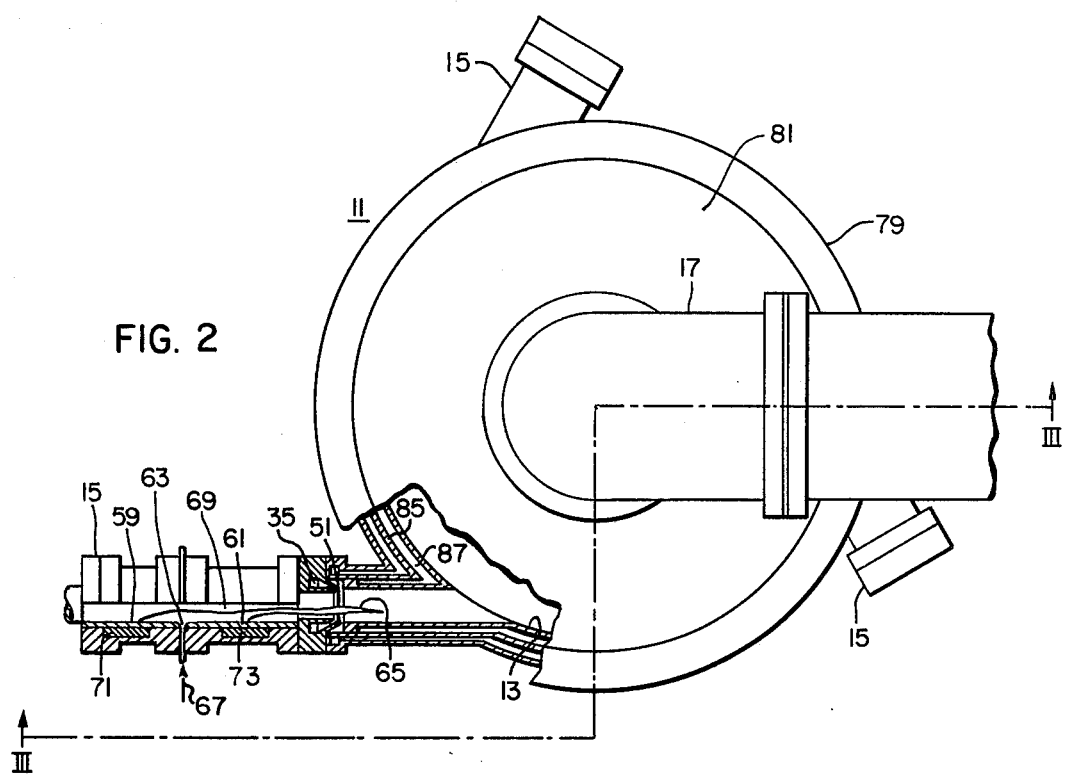
FIG. 2 is a plan view partly in section of the reactor having three arc heaters.

As shown in FIG. 2, one or more and preferably three arc heaters 15 are similar in construction and operation to that disclosed in U.S. Pat. No. 3,705,975, entitled "Self-Stabilizing Arc Heater Apparatus" of which the inventors are C. B. Wolf and M. G. Fey. Because the full disclosure in that patent, the description of the arc heaters 15 is limited herein to the basic structure and operation. The arc heaters 15 are each a single phase, self-stabilizing AC device capable of operation at power levels up to about 3500 kilowatts, or up to about 10,000 kilowatts for a three phase plant insulation. In the practice of this invention, it is preferred that three arc heaters be provided, one for each of the three phases of the AC power supply. As shown in FIG. 2, the arc heater 15 has two annular copper electrodes 59, 61 which are spaced at 63 about one millimeter apart to accommodate a line frequency power source of about 4 kV. An arc 65 occurs in the space or gap 63 and incoming feed stock gas immediately blows the arc 65 from the space into the interior of the arc chamber 69. The feed stock gas 67 must be compatible with the particular metal being reduced in the reactor 11 and may be one of the gases selected from the group consisting of argon, helium, hydrogen, carbon monoxide, or a mixture thereof. The arc 65 rotates at a speed of about 1000 revolutions per second by interaction of the arc current (several thousands amps AC) with a DC magnetic field set up by internally mounted field coils 71, 73. The velocities yield a very high operating efficiency for equipment of this type and the elongated arc 65 is ultimately projected by the gas downstream toward and possibly into the reaction chamber 13.

Feed stock material is introduced through inlet ports 35, 51. Preferably downstream of the electrodes 61 so that the materials enter into the arc heated gas stream 65.

The reacting materials are tetrachloride salts of the particular metal to be produced such as titanium, hafnium, and zirconium. The other reactant is a metal of the alkali or alkaline-earth metals, such as sodium and magnesium, the latter of which is preferred for economic reasons. The metal salt however is not limited to a chloride, but may include any halide such as a bromide. When introduced into the downstream arc zone, the materials introduced through the inlet ports 35, 51 react substantially as shown in the following formulas:

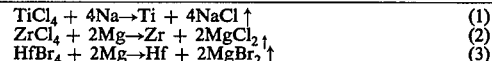
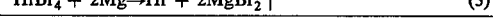

$$TiCl_4 + 4Na \rightarrow Ti + 4NaCl \uparrow \qquad (1)$$
$$ZrCl_4 + 2Mg \rightarrow Zr + 2MgCl_2 \uparrow \qquad (2)$$
$$HfBr_4 + 2Mg \rightarrow Hf + 2MgBr_2 \uparrow \qquad (3)$$

The foregoing formulas are exemplary of the possibilities available for producing the respective metals. It is understood that titanium, zirconium, or hafnium may be introduced as either a chloride or bromide which in turn is reacted with either sodium or magnesium to produce the products indicated in the formulas (1), (2), (3). For the foregoing reactions to successfully produce the desired product metal, a metal must have a melting point greater than the boiling point of the co-product salt, whereby they are subsequently separated with the metal in the liquid state and the salt in the gaseous state. The minimum reaction temperature for the foregoing formulas must be above the boiling point of either of the salts, that is, the chloride or bromide of sodium or magnesium. The maximum temperature is 3500° K (3227° C). In the following table, a list of the melting points for the elements titanium, zirconium, and hafnium and the boiling points for the several compounds or salts are listed.

TABLE I

| Element | Melting Point | Compound | Boiling Point |
|---|---|---|---|
| Titanium | 1800° C | NaBr | 1390° C |
| Zirconium | 1857° C | $MgCl_2$ | 1412° C |
| Hafnium | 1700° C | NaCl | 1413° C |
|  |  | $MgBr_2$ | 1284° C |

Accordingly, so long as the resulting metal has a melting point above the boiling point of the resulting compound or salt, the reaction will proceed.

Figure 3:
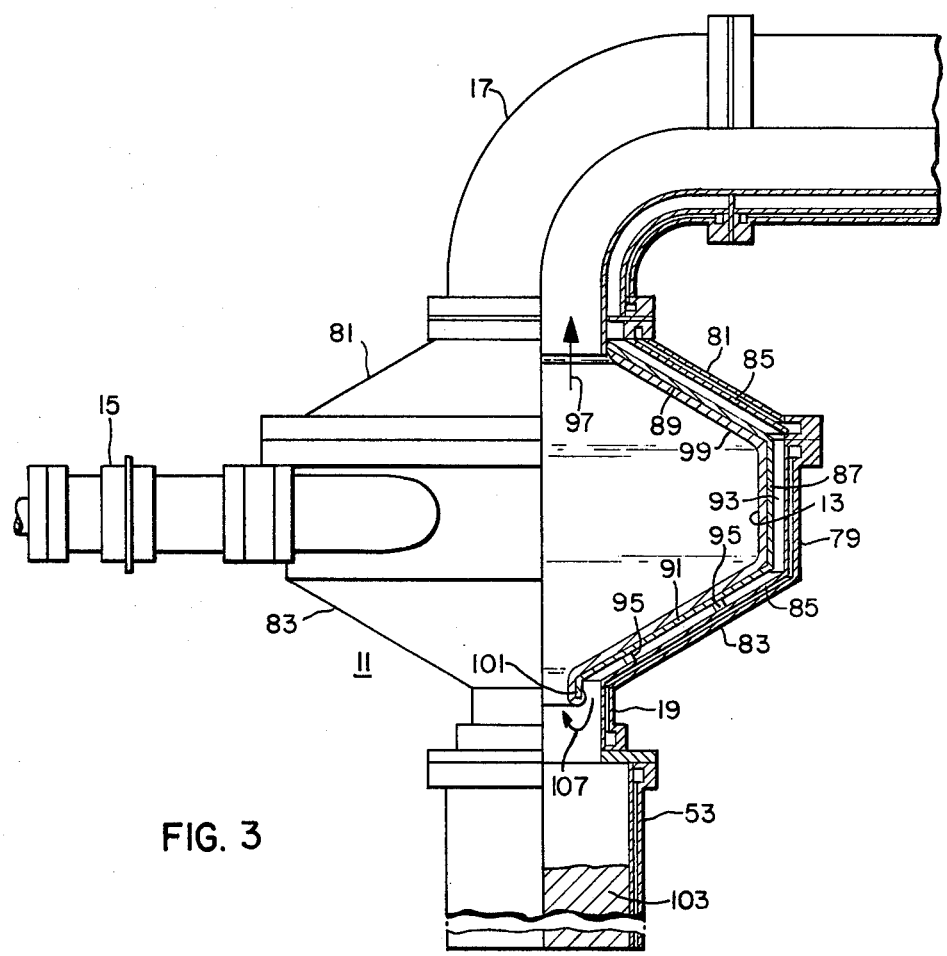
FIG. 3 is a vertical view taken on the line III—III of FIG. 2.

As shown in FIGS. 2 and 3, the arc heaters 15 are connected to the centrifugal or plasma chamber 13 tangentially. The chamber 13 is preferably cylindrical (FIG. 3) to enhance centrifugal separation of the light and heavy co-products of the foregoing reactions, whereby the lighter, gaseous salt products leave the reactor 11 via the outlet means 17 and the heavier metal exit through the outlet means 19.

The chamber 13 is contained between a peripheral wall 79 and opposite end walls 81, 83. The upper end wall 81 is preferably tapered upwardly from the peripheral wall 79 and joins the lower end of the outlet means 17 so that the co-product gases are more readily directed from the centrifugal zone within the chamber 13 towards the outlet means 17. Similarly, the lower end wall 83 is inclined downwardly, and as shown in the embodiment of FIG. 3, joins the outlet means 19 which communicates with the ingot mold or collection chamber 53 for the molten metal formed during the reaction. More particularly, the peripheral wall 79 and end walls 81, 83 are preferably cooled by water jacket means 85 of a conventional nature.

Moreover, in accordance with this invention, the chamber 13 comprises an inner wall or liner 87 which is substantially concentrically disposed and spaced from the peripheral wall 79 and the end walls 81, 83. The inner wall 87 preferably comprises upwardly and inwardly inclined upper wall portion 89 and a lower wall portion 91. The spacing 93 between the peripheral and end walls 79, 81, 83 and the inner walls 87, 89, 91 is maintained in a suitable manner such as by spaced ceramic support rings 95 (FIG. 3).

The inner wall means including the walls 87, 89, 91 are provided to operate at high wall temperatures where a liquid product such as titanium, zirconium, and hafnium, is the product of the reaction within the chamber 13. As the liquid metal separates centrifugally from the cool product gas which leaves the reaction chamber 13 through the outlet as indicated by the arrow 97, the liquid metal deposits on the inner walls 87, 89, 91 to form a solidified metal layer 97 having a thickness which is established by heat transfer equilibrium which thickness is normally limited to less than two inches. In view of the high temperature involved within the chamber 13, the inner walls 87, 89, 91 are composed of a high temperature material such as tantalum or tungsten. The inner walls 87, 89, 91 are cooled by radiation to the water cooled outer walls 79, 81, 83.

Inasmuch as the heat transfer from the inner walls 87, 89, 91 to the outer water cooled walls 79, 81, 83 is critical to the operation of the reactor 11, certain product materials or metals have different thermal properties or coefficients of heat transfer which require additional control means for preventing heat escape from the chamber too rapidly. Where a metal layer 97 has a relatively high coefficient of thermal conductivity, an interior layer 99 of a ceramic material, such as MgO, is provided in a thickness sufficient to delay ultimate transfer of heat to the water cooled peripheral wall. The thickness of the solidified metal layer 97 is dependent upon a temperature gradient through the layer as well as the thermal equilibrium status within the chamber including the zone between inner wall 87 and the peripheral wall 79. Accordingly, the surface of the metal layer 97 farthest from the inner wall 87 remains liquid and runs down the metal layer surface and exits at the lower end thereof into the ingot mold 53. For that purpose, the lower end of the inner wall 91 is preferably provided with a flange or drip portion 101 extending into the outlet means 19, thereby preventing the molten metal product from depositing on or contacting the walls forming the outlet means 19. Thus, a metal ingot 103 forms in the ingot mold 53.

Figure 5:
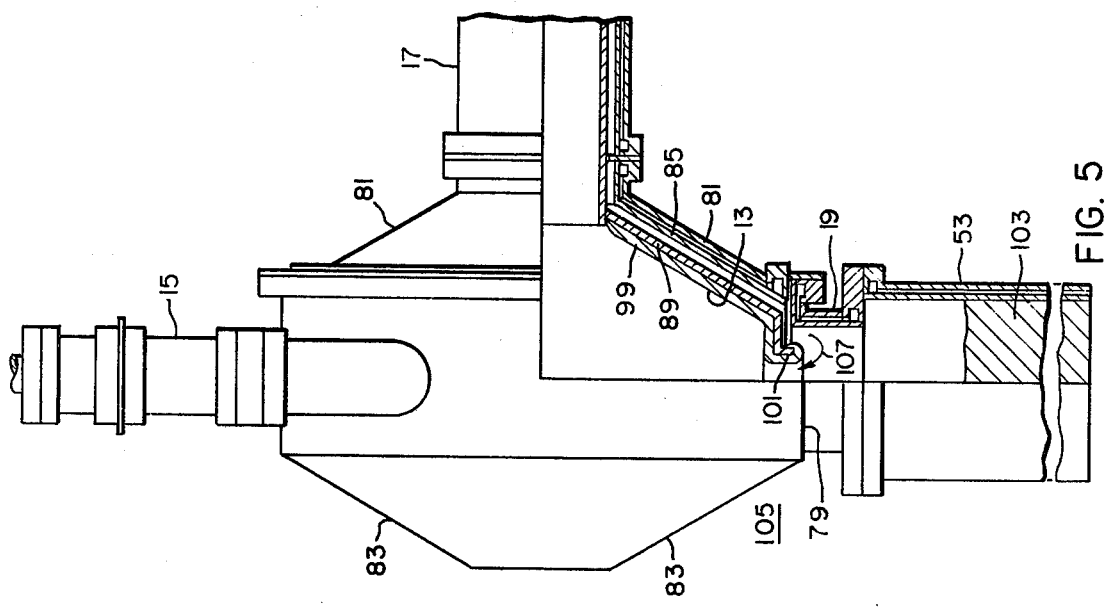
FIG. 5 is an elevational view, partly in section, taken on the line V—V of FIG. 4.
Figure 4:
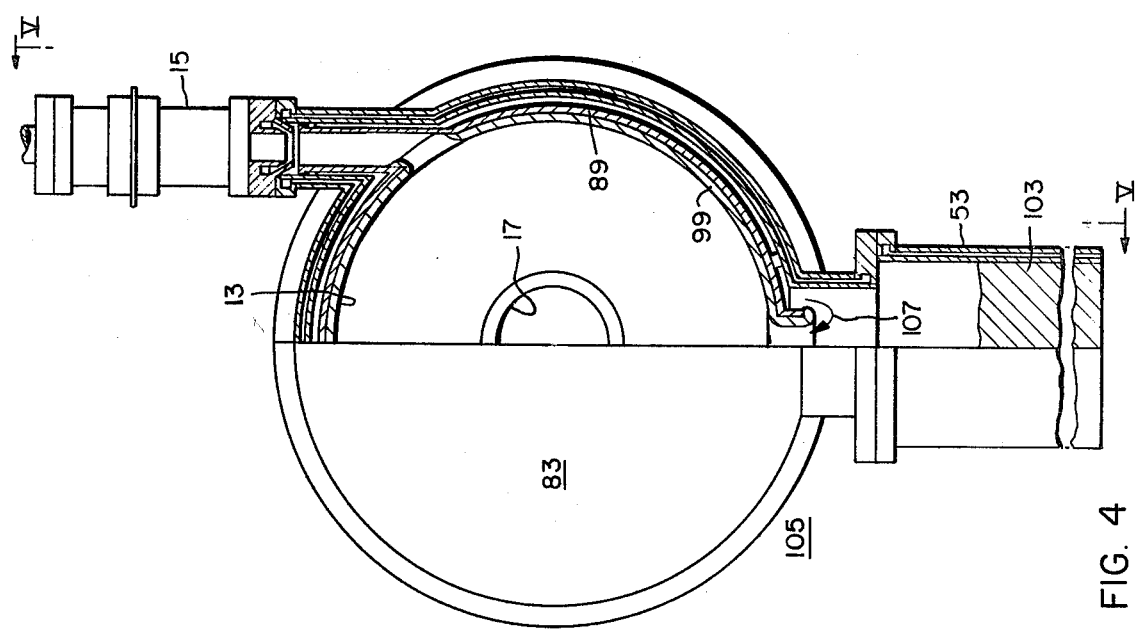
FIG. 4 is an elevational view, partly in section, of another embodiment of the invention.

Another embodiment of the invention is shown in FIGS. 4 and 5 in which a reactor generally indicated at 105 comprises parts with reference numbers similar to those of the reactor 11 (FIGS. 2 and 3). More particularly, the reactor 105 (FIGS. 4 and 5) is disposed on a different axis so that the lowermost part of the reactor 105 is a portion of the peripheral wall 79 where the outlet means 19 is disposed for accumulating the downwardly flowing liquid metal as it accumulates at the metal layer 99. The gas outlet means 17 is disposed in the end wall 81 similar to that of the reactor 11. In all other respects the reactor 105 has similar structural and operational features as those of the reactor 11.

It is noted that where the reactant contains oxidizing agents, the liners 87, 89, 91 are composed of a refractory material instead of a metal such as tantalum and tungsten. In addition, the exterior of the liner 89 is blanketed by an inert gas to prevent oxidation. Furthermore, the inert gas is circulated as shown by the arrow 107 to prevent the entrance of any undesirable materials such as magnesium chloride into the casting chamber of the mold 53.

In addition, some processes do not require a vortex separation of material, but could benefit from the application of downstream sections constructed in a similar manner as for instance, the exhaust connection to the vortex chamber. Such construction would in many cases reduce the overall heat transfer to the water cooled walls, and promote more uniform temperatures throughout the mixture and there would be less tendency for condensation to take place on the walls. That type of construction could be very useful where a long resonance time in a heated gas is required as in the processing of powdered materials.

The following example is exemplary of the process of this invention.

EXAMPLE

As shown in FIG. 1, titania and coke are reacted with chlorine to produce $TiCl_4$, $CO_2$, and traces of $FeCl_3$, which are separated by filtering. The $TiCl_4$ is condensed in washer 43 and gaseous $CO_2$ is then removed. After being vaporized, the purified $TiCl_4$ (gas) is injected into the plasma reactor chamber 13. A liquid alkali metal, sodium or magnesium, is atomized and simultaneously injected into the reactor chamber, which is maintained at the reaction temperature of 2200° K by an arc heated stream of 0.67 moles of hydrogen and 0.33 moles of argon, preheated to an energy level of 12,000 BTU per pound. As the titanium is formed in the liquid state (m.p. = 1998° K), the alkali salt leaves the reactor as a vapor (b.P. = 1686° K for NaCl and 1685° K for $MgCl_2$) along with the arc-heated hydrogen-argon mixture, which is used merely as a heat transfer agent. The arc heated reduction unit is a cyclonic separation device with a strong vortex used to induce the fine droplets of elemental titanium to deposit and run down the wall, while the vaporized salt exits through the top center along with the hydrogen-argon stream. The walls of the cyclone unit are an equilibrium layer of titanium, molten on the inside, and water or radiation cooled on the outside. The titanium is then cast into ingot form.

After leaving the plasma reduction unit, the metal chloride vapor and heat transfer gases are cooled below the chloride dew point by admixture of liquid metal and cold hydrogen-argon. The metal salt is then collected in a molten wall cyclone. The salt is then separated electrolytically in existing technology cells and the alkali metal and chlorine are circulated to their respective loops in the process. The hydrogen-argon mixture is cleaned, cooled, compressed, and recirculated to the arc heaters.

A preliminary estimate of energy and mass flow requirements was made for titanium production when using either sodium or magnesium as the reducing agent. The Table II below represents the requirements for the production of 50,000 tons per year.

TABLE II

| Plasma Reactor: | Sodium Reduction | Magnesium Reduction |
|---|---|---|
| Input: $TiCl_4$ (tons per year) | 197,840 | 197,840 |
| Alkali Metal (tons per year) | 95,992 | 50,741 |
| Arc Gas ($H_2$ + Ar) (tons per year) | 31,609 | 21,379 |
| Output: Ti (tons per year) | 50,000 | 50,000 |
| Salt (tons per year) | 244,008 | 98,770 |
| Gas ($H_2$ − Ar) (tons per year) | 31,609 | 21,379 |
| Power Requirements: | | |
| Arc Power KW | 37,045 | 25,055 |
| Salt Regeneration KW | 179,984 | 114,168 |

The use of magnesium as a reducing agent appears to be the most economical approach. A preliminary estimate of total production costs including capital investment requirements indicates that titanium could be produced by this process at a cost of 30 to 40 cents per pound. Titanium currently sells for $5.00 and above per pound.

Accordingly, the reactor of the present invention provides for a unique assembly of an arc heater and reaction chamber which is suitable for either single phase or three phase operation, i.e. for one or three arc heaters the latter of which has three phases. Such an assembly is also suitable for high power and high production rates in continuous operation. Finally, an arc heater and reaction chamber design which in the case of exothermic reaction, provides the utilization of at least part of heat reaction in promoting reaction.

What is claimed is:

1. A process for reducing a metal from a chloride salt comprising the steps of:
   a. providing an arc heater having at least a pair of axially spaced tubular electrodes forming an elongated arc chamber communicating with a reaction chamber, which arc chamber is coextensive with the spaced tubular electrodes,
   b. striking an electric arc in an axial gap between the electrodes,
   c. introducing a pressurized gas selected from the group consisting of argon, helium hydrogen, and carbon monoxide, radially inwardly through the gap and into the arc chamber to blow the electric arc from the gap and into the interior of the elongated arc chamber to form an elongated arc jet stream comprising the pressurized gas and projecting from the arc chamber into the reaction chamber,
   d. feeding into the arc jet stream a quantity of one element selected from the group consisting of an alkali metal and an alkaline-earth metal,
   e. feeding into the arc jet stream a quantity of a chloride of a metal having a melting point higher than the boiling point of the co-product salt formed with the metal, the co-products being a liquid elemental metal and a gaseous salt,
   f. projecting the reaction products into the reaction chamber tangentially to cause the liquid elemental metal to separate centrifugally from the lighter, gaseous salt, and
   g. depositing the liquid elemental metal on a downwardly extending surface to permit the metal to flow into an associated receptacle.

2. The process of claim 1 in which three arc heaters are provided in peripherally spaced positions around the reaction chamber.

3. The process of claim 1 in which said one element is sodium.

4. The process of claim 1 in which said one element is magnesium.

5. The process of claim 1 in which titanium tetrachloride is fed in step (e) and liquid titanium is a co-product.

6. The process of claim 1 in which zirconium dichoride is fed in step (e) and liquid zirconium is a co-product.

7. The process of claim 1 in which the maximum operating temperature is 3500° K.

8. The process of claim 7 in which magnesium and titanium tetrachloride are fed in steps (d) and (e).

9. The process of claim 7 in which magnesium and zirconium tetrachloride are fed in steps (d) and (e).

* * * * *